Sept. 11, 1928.  1,683,998
S. SUITS
HEADLIGHT
Filed April 6, 1927  2 Sheets-Sheet 1

WITNESSES:
Alfred E. Schinger
Wesley P. Merrill

INVENTOR:
Seymour Suits,
BY:
Joshua R. H. Potts,
ATTORNEY.

Sept. 11, 1928.  S. SUITS  1,683,998
HEADLIGHT
Filed April 6, 1927   2 Sheets-Sheet 2

WITNESSES:
Alfred E. Oschinger
Wesley P. Merrill

INVENTOR:
Seymour Suits,
BY:
Joshua R. H. Potts,
ATTORNEY.

Patented Sept. 11, 1928.

1,683,998

UNITED STATES PATENT OFFICE.

SEYMOUR SUITS, OF PHILADELPHIA, PENNSYLVANIA.

HEADLIGHT.

Application filed April 6, 1927. Serial No. 181,372.

My invention relates to headlights and more particularly to headlights having paraboloidal reflectors, such as are commonly used on motor vehicles.

In headlights of this class, an electric lamp is placed within the reflector with its filament theoretically at the focus of the paraboloid so that, also theoretically, the rays of light from the lamp will be reflected outwardly in parallel lines. However, the filament of an electric lamp has both length and breadth so that it must extend beyond the focus in one or more directions with the result that some of the light rays are reflected at an angle to the main beam of light. As the lamp in a headlight is usually focused to obtain the maximum amount of light, the front end of the filament extends forwardly beyond the focal point of the paraboloid and rays of light transmitted therefrom are reflected outwardly and upwardly from the lower portion of the reflector. This condition makes it impossible to adjust the headlights of a motor vehicle so that there are no upwardly reflected rays of light and a more serious condition arises from the moving of the lamp out of the principal focus due to jarring and vibration.

One of the objects of my invention is to provide means for preventing any of the rays of light of an automobile headlight from being reflected upwardly so as to cause glare in the eyes of an approaching driver.

Another object of the invention is to provide a headlight so that all its rays are reflected forwardly, downwardly and on a spread in order to procure the maximum amount of light at the desired point.

Still another object is to provide a headlight in which the focal point of the light source will not be critical in order that no rays of light will be reflected upwardly even when the light source has moved out of the principal focus.

As my invention is primarily intended for use on motor vehicles, another object of my invention is to provide means whereby the device may be quickly and easily installed thereon.

According to the invention the headlight has a paraboloidal reflector, a glass closure, a light source consisting of a lamp, an antiglare device comprising a sub-reflector covering the lower portion of the reflector and of the same shape and size as the portion covered, a bracket attached to the upper portion of the sub-reflector and spacing it from the reflector, and a flange on the sub-reflector bolted to the closure adjacent its edge and disposed between it and the edge of the reflector.

The drawings illustrate an embodiment of the invention and the views therein are as follows:—

Figure 1:
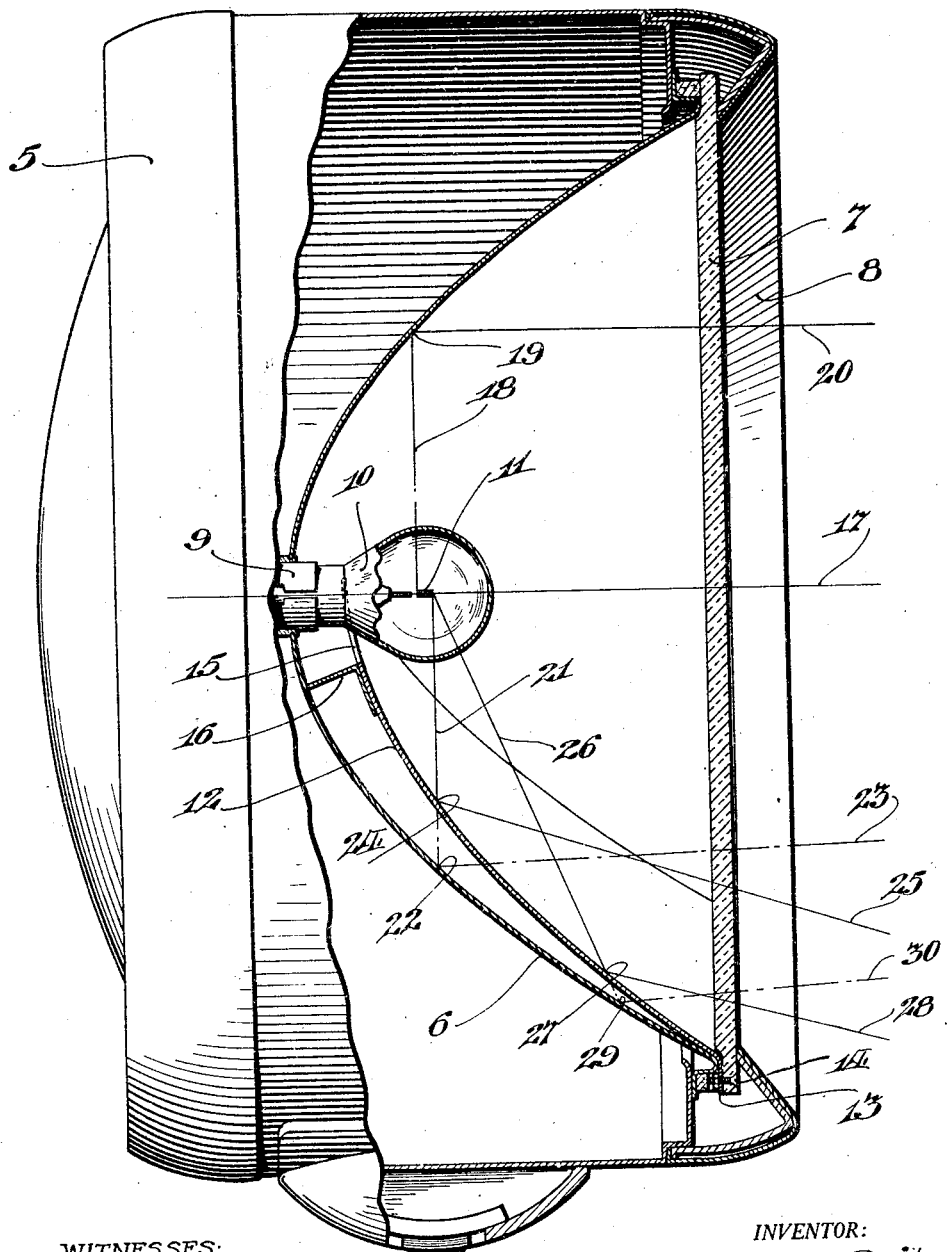
Figure 1 is a side view of an automobile headlight, partly in full and partly in section.

Referring to the drawings, the headlight has a casing 5, in which is mounted a paraboloidal reflector 6, and a lens 7 is secured into the casing by means of a rim 8. A bayonet socket 9 is suitably mounted in the back of casing 5 and adapted to receive an electric lamp 10 which extends into reflector 6 so that its filament 11 is approximately at the focal point of the reflector. The parts thus far described are parts of a standard automobile headlight and form no part of my invention.

A sub-reflector 12 is provided with a flange 13 so that it may be secured to the bottom of lens 7 by means of bolts 14 passing through suitable holes in flange 13 and lens 7. Sub-reflector 12 is of the exact outline of a segment of reflector 6 and has a cut-out 15 at its upper point to provide clearance for lamp 10. A bracket 16 is secured to the upper part of sub-reflector 12 and adapted to bear against the inside of reflector 6 so as to hold the sub-reflector a predetermined distance away from the reflector, as plainly shown in Figure 1.

The length of bracket 16 is dependent upon the shape of reflector 6 and must be varied to meet the requirements of reflectors of different outlines. In the drawings, I have illustrated my invention as applied to a headlight such as is used on Packard cars. In this case, the focal point is 1¼ inches from the back of the paraboloidal reflector and bracket 16 is 7/16ths inches high. To fit a sub-reflector to different types of reflectors, the height of bracket 16 must be varied according to the distance between the focal point and the back of the reflector.

Figure 2:
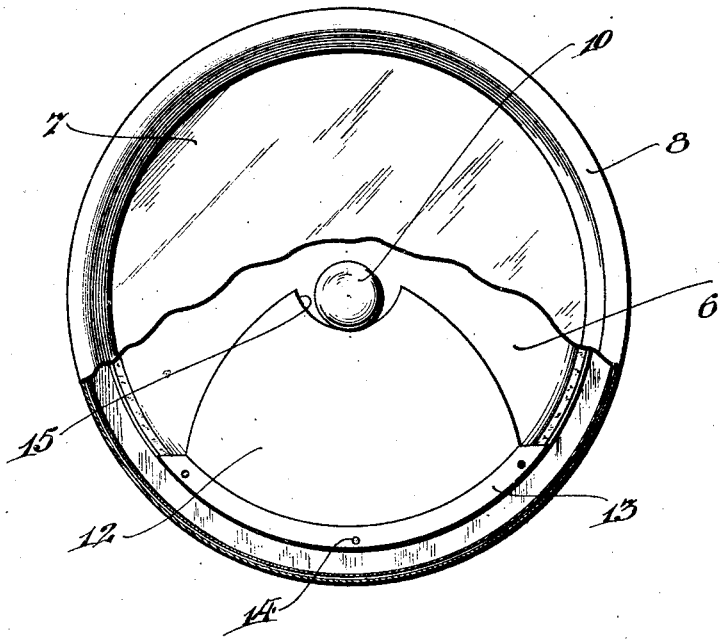
Figure 2 is a front view of an automobile headlight with a portion of the rim and lens broken away in order to illustrate my invention.
Figure 3:
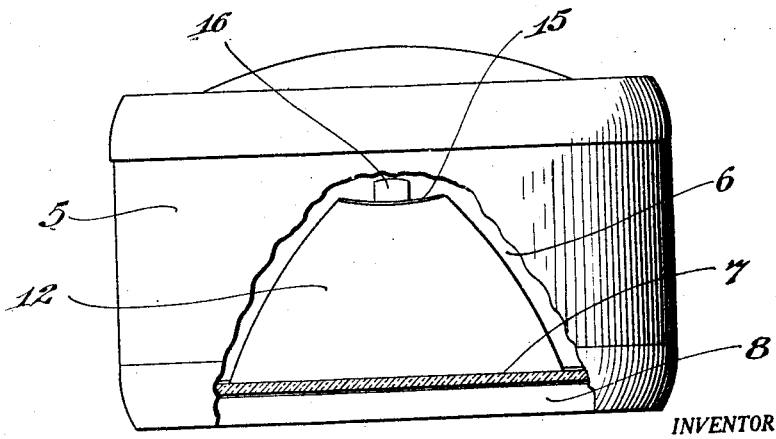
Figure 3 is a top plan view of the headlight shown in Figure 2, certain parts being broken away and the lamp omitted.

By referring to Figures 2 and 3, it will be noted that sub-reflector 12 covers a substantial portion of the lower part of reflector 6 and its relative size and outline should be maintained in adapting the invention to different reflectors, it being understood that the sub-reflector must always conform to the outline of the main reflector, i. e. the shape of the sub-reflector is identical with the portion of the main reflector covered by it, so that, if this portion were cut out of the main reflector and elevated a distance equal to the height of bracket 16, it would be identical with the sub-reflector.

In Figure 1, the focal point of reflector 6 is at the intersection of lines 17 and 18, so that a ray of light emanating from the focus will strike reflector 6 at point 19 and be reflected horizontally as shown by line 20. For the purpose of illustration, filament 11 has been shown as having its rear edge in the focus and extending forwardly therefrom so that a ray of light 21, emanating from the tip of filament 11, would strike reflector 6 at point 22 and be reflected outwardly and upwardly, as shown by dot-and-dash line 23 according to the well known principle that the angle of reflection is equal to the angle of incidence. However, with sub-reflector 12 in place, the ray of light 21 would strike sub-reflector 12 at point 24 and be reflected outwardly and downwardly as shown by line 25.

As rays of light emanating from a true focus and striking the surface of a true paraboloid sitting in a vertical plane will be reflected horizontally outward, it follows that rays of light emanating from any point in front of the focus and striking the lower surface of this paraboloid will be reflected upwardly. As the filament of an electric lamp has both length and breadth, it follows that it cannot be confined within the focus and that rays of light emanating from its portions which are not in true focus will be reflected either upwardly or downwardly. In focusing an automobile headlight to obtain its greatest efficiency, it is found that a substantial portion of the filament extends forwardly from the focal point and consequently the rays emanating therefrom are reflected upwardly from the lower portion of the reflector. The rays reflected by the side portions of the filament are also reflected at an angle from the sides of the reflector but they produce no blinding glare and consequently are not concerned in this discussion.

By inserting the sub-reflector at the angle shown in the drawings, the rays of light emanating from the forward end of filament 11 will be reflected downwardly regardless of the angle at which they strike the sub-reflector. This is illustrated by the ray of light 26 which strikes the sub-reflector at point 27 and is reflected outwardly and downwardly as shown by line 28, while if sub-reflector 12 were not in place, this ray of light would strike reflector 6 at point 29 and be reflected outwardly and upwardly as shown by dot-and-dash line 30.

It is a well known fact that the lamps in headlights are moved out of focus by the vibrations caused by the operation of the vehicle and often cause an extreme glare, consequently, the lamps must be frequently adjusted in order to comply with the laws of many States. With my device installed however, the angle of sub-reflector 12 is such that the focal point is not critical and the lamp may move a considerable distance out of focus without producing any glare. As the focus is not critical, headlights may be provided with fixed lamp sockets instead of the adjustable ones now in use and thus eliminate a source of annoyance.

Lens 7 may be made of clear glass but is preferably of the prismatic type which spreads the light to the sides of the road in order to give a sufficient width to the beam of light. In placing this device on the market, the sub-reflector is secured to a lens and adapted for use on a particular automobile so that the size of lens 7 and the curvature of sub-reflector 12 will correspond with the lens and reflector originally installed on the car.

In use, I find that a maximum amount of light may be obtained from a headlight without producing the blinding glare customary in such lights and which is not entirely overcome by the use of prismatic lenses. Also, this device allows the headlights to be so adjusted that a beam of light may be thrown a greater distance from the motor vehicle before striking the ground as no rays of light can be reflected upwardly.

Of course the headlight illustrated may be modified in various ways without departing from the invention herein set forth and hereafter claimed.

I claim:

In a headlight having a paraboloidal reflector, a glass closure and a lamp, an antiglare device including a sub-reflector covering the lower portion of the reflector and of the same contour as the portion covered, a bracket attached to the upper portion of the sub-reflector for spacing it from the reflector, and a flange on the sub-reflector bolted to the closure adjacent its edge and disposed between it and the edge of the reflector.

In testimony whereof I have signed my name to this specification.

SEYMOUR SUITS.